United States Patent [19]

Misra et al.

[11] Patent Number: 4,863,816
[45] Date of Patent: Sep. 5, 1989

[54] ALKALI METAL POLYSILICA GEL ELECTROLYTE LEAD-ACID BATTERY AND METHOD FOR MAKING THE SAME

[75] Inventors: Sudhan S. Misra, Lansdale; Terrence M. Noveske, Pipersville, both of Pa.

[73] Assignee: C&D Power Systems, Inc., Plymouth, Pa.

[21] Appl. No.: 79,086

[22] Filed: Jul. 29, 1987

[51] Int. Cl.⁴ .............................................. H01M 10/10
[52] U.S. Cl. ..................................... 429/190; 429/204
[58] Field of Search .................... 429/190, 204, 205; 423/338

[56] References Cited

U.S. PATENT DOCUMENTS

| | | | |
|---|---|---|---|
| 1,060,832 | 5/1913 | Fallek | 429/190 |
| 1,389,750 | 9/1921 | Gardiner | 429/204 X |
| 1,416,195 | 5/1922 | Hacking | 429/204 X |
| 1,417,007 | 5/1922 | Williams | 204/2.1 |
| 2,483,868 | 10/1949 | Archer et al. | 423/338 |
| 2,542,574 | 2/1951 | Ruben | 429/190 X |
| 3,257,237 | 6/1966 | Jache | 429/54 |
| 3,457,112 | 7/1969 | Reber | 429/190 X |
| 3,711,332 | 1/1973 | Bastacky | 429/190 X |

*Primary Examiner*—Anthony Skapars

[57] ABSTRACT

A method for producing a lead-acid battery having a thixotropic gel electrolyte, comprising an aqueous colloidal dispersion of alkali metal polysilica with sulfuric acid while introducing said combination into a lead-acid battery precursor.

8 Claims, 3 Drawing Sheets

ALKALI METAL POLYSILICA GEL ELECTROLYTE LEAD-ACID BATTERY AND METHOD FOR MAKING THE SAME

BACKGROUND OF THE INVENTION

1. Field of the Invention

This invention relates to lead-acid batteries having gelled electrolytes and methods for making such batteries.

2. Description of the Prior Art

Gelled electrolyte lead-acid batteries are known and have been available for commercial use since the early 1920's, as evidenced by the May 15, 1921 issue of *The Commercial Car Journal*, page 102.

Of the patent prior art, U.S. Pat. Nos. 1,389,750; 1,416,195; 1,417,007; 1,572,586; 2,483,868; 3,305,396; 3,257,237; 3,457,112 and 3,711,332 are known to applicant. Of these, U.S. Pat. Nos. 3,711,332 is most relevant to the apparatus aspect of this invention while U.S. Pat. Nos. 2,483,868 and 3,305,396 are most relevant to the method aspect of this invention.

Concerning the apparatus aspect of the invention, U.S. Pat. No. 3,711,332 discloses utilizing a ratio of sulfuric acid to aqueous sodium silicate solution ($Na_2SiO_3$) of from 6:1 to 10:1 to form the electrolyte gel, with the ratio of sodium silicate to water forming the aqueous sodium silicate solution being about 1:1. Sodium silicate, $Na_2SiO_3$, as disclosed and taught by U.S. Pat. No. 3,711,332, is conventionally referred to as "water glass."

U.S. Pat. No. 3,711,332 uses electrolyte which forms a liquid phase above the gel phase in the battery, with the two phase system (consisting of the liquid and the gel) changing proportions during battery operation. The liquid phase enters the gel phase during battery discharge and reemerges from the gel phase during battery charging. Depending upon the assumption used for the specific gravity of the sodium silicate and the resultant sodium silicate solution, the ratio of sodium silicate to sulfuric acid ranges from 5.5 to 9.1 in U.S. Pat. No. 3,711,332 (for sodium silicate specific gravity of 2.4), ranges from 14.6 to 19.4 in U.S. Pat. No. 3,711,332 (for sodium silicate specific gravity of 1.4) and ranges from 10.9 to 18.2 in U.S. Pat. No. 3,711,332 (for sodium silicate specific gravity of 1.2).

U.S. Pat. No. 2,483,868 discloses production of 94% anhydrous silica gel at column 1, line 4. Silica, as sodium silicate solution, is sprayed into sulfuric acid to form a sol which turns to a gel as taught at column 2, line 7 of '868. As high as 17% silica results. The sulfuric acid is maintained in a baffled tank.

U.S. Pat. No. 3,305,396 recites that it is known to produce colloidally dispersed silicon as silicic acid for use in dry electrolytes, having a silica particle size of five (5) to twenty (20) microns or less, as taught at column 1, lines 26 and 31. '396 relates to dry cells with electrolytes consisting of sulfuric acid with colloidal silicic acid, as taught at column 1, line 60. The thixotropic electrolyte consisting of sulfuric acid and colloidally dispersed silicic acid is reduced to liquid in a high speed mixer and introduced into the cell housing in an evacuated space, as taught at column 1, line 69. The silicic acid is produced by the pyrogenic method from silicon tetrachloride and is free from alkaline substances, as taught at column 3, line 5.

Prior art practice includes using solid fumed silica ($SiO_2$) and combining that with $H_2SO_4$ in a mixing process which takes about 12 hours and pouring the resultant slurry into a dry charged battery. This process is exceedingly time consuming and expensive.

Aqueous dispersions of colloidal alkali metal silicas are known for use as binders in ceramic investment shell casting and foundries with alcohol being combined with the aqueous colloidal dispersion when faster shell drying and earlier green strength is desired. Using an aqueous colloidal dispersion of an alkali metal polysilica, specifically sodium polysilica, results in ceramic investment shell castings having very smooth surfaces and very close design tolerances.

In the past, some artisans have mixed dry fumed silica with sulfuric acid to provide a gel for introduction into a lead-acid battery precursor. This mixing procedure is quite time consuming, typically taking from 18 to 24 hours for mixing. The dry fumed silica is very fine, making it very difficult to handle. The dry fumed silica-sulfuric acid blend is difficult to keep sufficiently liquid so that the blend flows easily enough to be introduced into the battery precursor. In this prior practice, the fumed silica blend material is converted into the gel form before being introduced into the battery; the thixotropic characteristic of the gel blend material makes it feasible to hold the gel in a liquid condition through continuous mixing and to introduce it into the battery, but with some difficulty.

SUMMARY OF THE INVENTION

A lead-acid battery exhibiting surprising and unexpected performance characteristics has an improved thixotropic gel electrolyte consisting essentially of a blend of (a) an aqueous colloidal dispersion of from about ten percent (10%) to about fifty percent (50%), preferably from about fifteen percent (15%) to about thirty percent (30%) and most preferably of about thirty percent (30%) by weight alkali metal polysilica, having the formula $[Y_2O] \cdot x[SiO_2] \cdot nH_2O$ where x ranges from about 20 to about 350, Y is an alkali metal, preferably sodium, and n is the number of moles of water and (b) sulfuric acid, in a ratio of from about one (1) part of the aqueous colloidal dispersion of the alkali metal polysilica to about one (1) part sulfuric acid to about one (1) part of the aqueous colloidal dispersion of the alkali metal polysilica to about six (6) parts sulfuric acid, by volume. The conventional liquid sulfuric acid has specific gravity, prior to blending with the aqueous colloidal dispersion of the alkali metal polysilica, of from about 1.1 to about 1.5, most preferably about 1.3 to about 1.4. The battery exhibits surprising and unexpected performance characteristics relative to known thixotropic gel lead-acid batteries.

A formed wet battery or battery precursor from which free electrolyte has been removed is used to manufacture the gelled electrolyte lead-acid battery. Use of the formed wet battery or battery precursor substantially reduces manufacturing costs.

A method for producing a lead-acid battery having such an improved thixotropic gel electrolyte and exhibiting surprising and unexpected performance characteristics may be a continuous or an intermittent process. In one process an aqueous colloidal dispersion of about ten percent (10%) to about fifty percent (50%), preferably from about fifteen percent (15%) to about thirty percent (30%) and most preferably about thirty percent (30%) by weight alkali metal polysilica, having the formula $[Y_2O] \cdot x[SiO_2] \cdot nH_2O$, where x ranges from about 20 to about 350, Y is an alkali metal, preferably sodium, and n is the number of moles of water, is used. This aqueous colloidal dispersion may be produced by blending dry alkali metal polysilica with water such that the resulting aqueous colloidal dispersion of alkali metal polysilica has a specific gravity of about 1.1 to about 1.5, most preferably about 1.3 to about 1.4. The aqueous colloidal dispersion of the alkali metal polysilica may range in pH from about 8 to about 12 with a pH of 10 being preferable. pH is not a parameter sought to be controlled per se; monitoring and regulating pH is merely a means of maintaining stability of the aqueous colloidal dispersion formed using the alkali metal polysilica. Aqueous colloidal dispersions of sodium polysilica work well.

Once the aqueous colloidal dispersion of the alkali metal polysilica is provided, it may be and preferably is continuously dynamically combined with liquid sulfuric acid to provide the gel electrolyte. Preferably, the ratio of the aqueous colloidal dispersion of alkali metal polysilica to sulfuric acid is from about one (1) part aqueous colloidal dispersion of alkali metal polysilica to about (1) part sulfuric acid to about one (1) part aqueous colloidal dispersion of alkali metal polysilica to about six (6) parts sulfuric acid, by volume. The liquid sulfuric acid has a specific gravity prior to blending with the aqueous colloidal dispersion of the alkali metal polysilica of from about 1.1 to about 1.5, preferably about 1.3 to about 1.4. The preferred specific gravity varies depending on desired rate of battery discharge, desired battery float voltage and intended use of the battery.

This blended solution is preferably filled into a lead-acid battery precursor as the solution is dynamically blended by combining the aqueous colloidal dispersion of the alkali metal polysilica with the sulfuric acid; the resulting blended solution in the battery precursor defines a lead-acid battery.

Once the blended solution is placed into the precursor, the battery having the blended solution consisting of the aqueous colloidal dispersion of the alkali metal polysilica and sulfuric acid is maintained in a quiescent state until the blended solution thickens into gel due to reaction of the alkali metal polysilica with the sulfuric acid.

The aqueous colloidal dispersion of alkali metal polysilica may be prepared continuously, preferably by blending the alkali metal polysilica with water. The alkali metal is preferably sodium. The resulting electrolyte consists of the alkali metal polysilica dispersed essentially uniformly throughout the liquid sulfuric acid and is homogeneous.

The specific gravity of the liquid sulfuric acid before mixing with the aqueous colloidal dispersion of alkali metal polysilica preferably ranges from about 1.2 to about 1.4 and most preferably is about 1.3 to about 1.4. Mixing the aqueous colloidal dispersion of the alkali metal polysilica and the liquid sulfuric acid is preferably performed dynamically, by blending these components in a stream while filling a lead-acid battery precursor with the stream being blended.

DESCRIPTION OF THE PREFERRED EMBODIMENTS AND BEST MODE KNOWN FOR PRACTICING THE INVENTION

Figure 1:
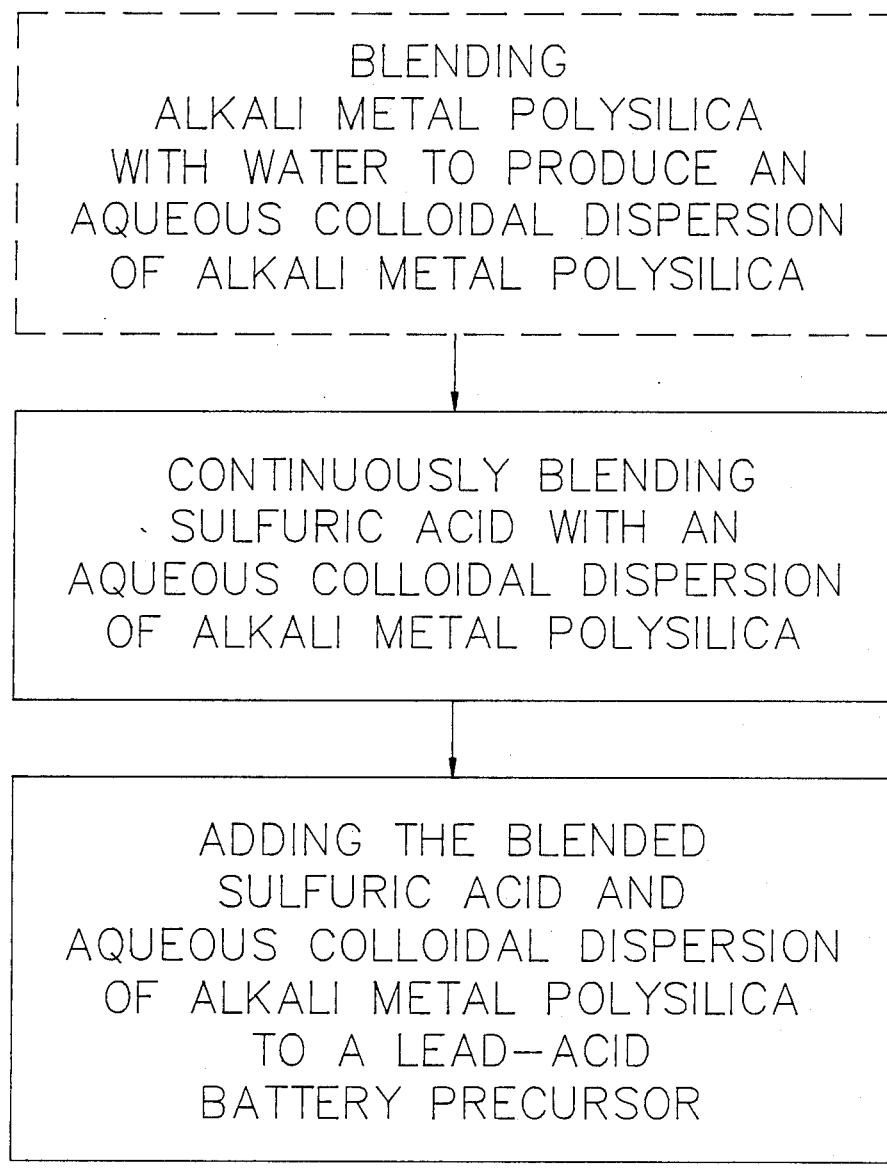
FIG. 1 is a schematic diagram illustrating the process of the invention.

Referring to the drawings and particularly to FIG. 1, the process of the invention may begin with an aqueous colloidal dispersion of an alkali metal polysilica. Suitable aqueous colloidal dispersions of alkali metal polysilica are commercially available.

As an alternative to purchasing the aqueous colloidal dispersion of the alkali metal polysilica, the aqueous colloidal dispersion may be prepared, preferably by continuously blending alkali metal polysilica, preferably sodium polysilica, with water. The optional, alternative nature of the step of continuously blending the alkali metal polysilica with water to obtain an aqueous colloidal dispersion of alkali metal polysilica is indicated in FIG. 1 by the dotted line forming the box enclosing this step of the process. The preferred process includes the steps enclosed in solid lines in FIG. 1.

The preferred sodium polysilica has a chemical formula of $[Y_2O] \cdot x[SiO_2] \cdot nH_2O$ where x ranges from about 20 to about 350. The exact percent of silicon dioxide by weight will depend on the specific gravity of the sulfuric acid electrolyte used and the concentration of polysilica desired. The sulfuric acid is conventional lead-acid battery liquid electrolyte.

Once the aqueous colloidal dispersion of the alkali metal polysilica has been prepared, concentrated sulfuric acid is added, preferably continuously, in an amount to result in a ratio of between about 1:1 to about 1:6 parts by volume of the aqueous colloidal dispersion of the alkali metal polysilica to sulfuric acid. This blend of sulfuric acid and the aqueous colloidal dispersion of the alkali metal polysilica is added, preferably continuously, to a battery precursor substantially as the sulfuric acid is blended with the aqueous colloidal dispersion of the alkali metal polysilica so that the resultant blend does not begin to gel before it has been introduced into the battery precursor. The blending is preferably performed in a nozzle while filling a lead-acid battery precursor with the blend.

Figure 2:
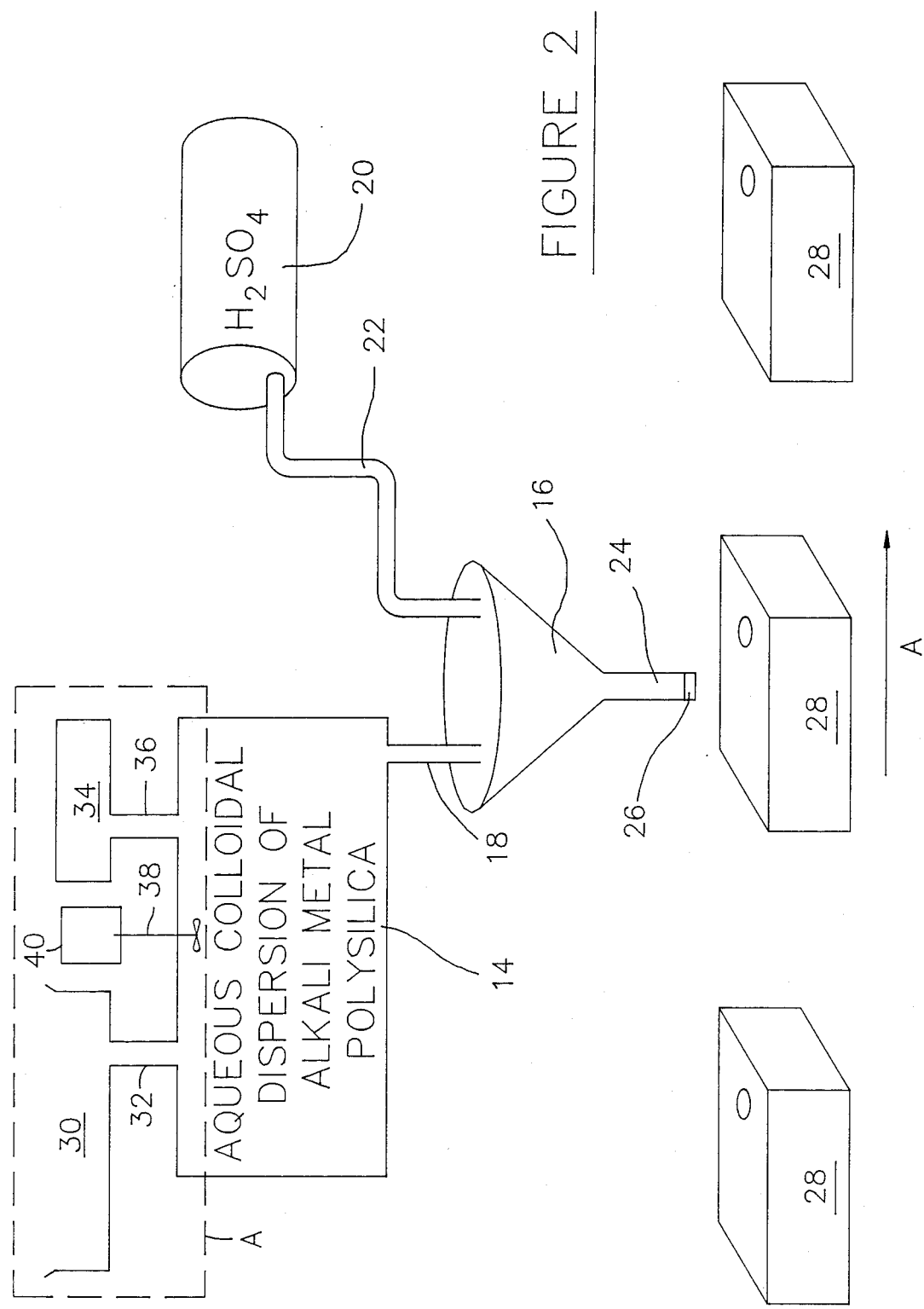
FIG. 2 is a schematic representation of apparatus useful for practicing the process of the invention.

Suitable apparatus for practicing the process aspect of the invention is illustrated schematically in FIG. 2 where the aqueous colloidal dispersion of alkali metal polysilica is illustrated being blended with sulfuric acid for introduction into lead-acid battery precursors. In FIG. 2 the aqueous colloidal dispersion of alkali metal polysilica is preferably within a tank 14 and is provided from tank 14 to a blending hopper 16 via line 18. Sulfuric acid is provided from tank 20 via line 22 to blending hopper 16. The solution of sulfuric acid and the aqueous colloidal dispersion of alkali metal polysilica preferably rapidly exits hopper 16 via conduit 24 with blending of the aqueous colloidal dispersion of the alkali metal polysilica and the sulfuric acid being performed in a nozzle 26, illustrated at the bottom of conduit 24, so that the blending is performed just as the combined blend is added to battery precursors 28.

The sulfuric acid is preferably forty (40) to fifty (50) weight percent sulfuric acid in tank 20 prior to being blended with the aqueous colloidal dispersion of the alkali metal polysilica.

Battery precursors 28 are formed, wet batteries from which the free electrolyte has been removed prior to addition of the blend of the aqueous colloidal dispersion of the alkali metal polysilica and the sulfuric acid. Use of such formed, wet batteries, as opposed to dry charged batteries which is the conventional practice in producing gelled electrolyte lead-acid batteries, greatly reduces manufacturing costs.

The dotted line box in FIG. 2 indicates the optional, alternative apparatus which may be provided if the aqueous colloidal dispersion of the alkali metal polysilica is prepared as a part of the process of the invention. In such case, dry alkali metal polysilica is provided from a storage hopper indicated generally as 30 to a blending tank 14 via a conduit 32. Water is provided from a storage tank 34 via a conduit 36 to blending tank 14. Within blending tank 14 a suitable mixing apparatus, designated schematically by mixing propeller and shaft 38 extending from motor 40, mixes the alkali metal polysilica with water to provide the required aqueous colloidal dispersion of alkali metal polysilica. The optional nature of this portion of the process is indicated by dotted box A in FIG. 2.

The specific performance characteristics of the batteries depends on concentration of acid in the battery. With fifty (50) weight percent sulfuric acid and using a commercially available aqueous colloidal dispersion of sodium polysilica having about thirty percent (30%) by weight sodium polysilica to water, an acceptable battery results. When the aqueous colloidal dispersion is about thirty percent (30%) by weight sodium polysilica to water, use of one (1) part of the aqueous colloidal dispersion to about three (3) parts of sulfuric acid is satisfactory. The aqueous colloidal dispersion of sodium polysilica and the sulfuric acid go through a static mixer, specifically and preferably a nozzle, and are blended into a single combined solution as that solution is introduced into the battery precursor.

After the blended solution of the aqueous colloidal dispersion of the alkali metal silica and the sulfuric acid have been added to the battery precursor, the battery is maintained with the blended solution therein in a quiescent state until the blended solution thickens to a gel due to reaction of the alkali metal polysilica with the sulfuric acid.

The blend is added to the battery precursors as soon as possible after the forming electrolyte has been removed from the battery precursors. This is because once the forming electrolyte is removed, the exposed negative plates, if allowed to air-dry, undergo an oxidation reaction manifesting itself as discharge of the plates. Considerable heat is produced in the course of such self-discharge and this, of course, is undesirable.

The blend is preferably added to the battery precursors to a level slightly over the tops of the separators between the battery precursor plates, but not very much above the tops of those separators. The precursors are preferably sealed immediately after forming electrolyte is removed therefrom, while awaiting addition of the electrolyte blend which will gel while in the battery. The blend should be added within about thirty (30) minutes after the forming electrolyte has been removed. The battery precursors may be sealed promptly after the electrolyte blend is added to the precursors.

The optional method steps of the invention noted above, specifically combining the alkali metal polysilica with water to produce the aqueous colloidal dispersion of the alkali metal polysilica, may be advantageously practiced at the facility where the aqueous colloidal dispersion is subsequently combined with sulfuric acid and introduced into the battery precursors. This is because the aqueous colloidal dispersion, once formed, should not normally be subjected to temperatures below freezing. If subjected to such temperatures, the alkali metal polysilica may precipitate out of the colloidal dispersion; after precipitating out of the colloidal dispersion the alkali metal polysilica cannot be re-dispersed therein. Also, because the aqueous colloidal dispersion is normally alkaline, transport of the aqueous colloidal dispersion of the alkali metal polysilica may be inconvenient, thereby further favoring preparation of the aqueous dispersion of the alkali metal polysilica on site, where the batteries are manufactured.

Figure 3:
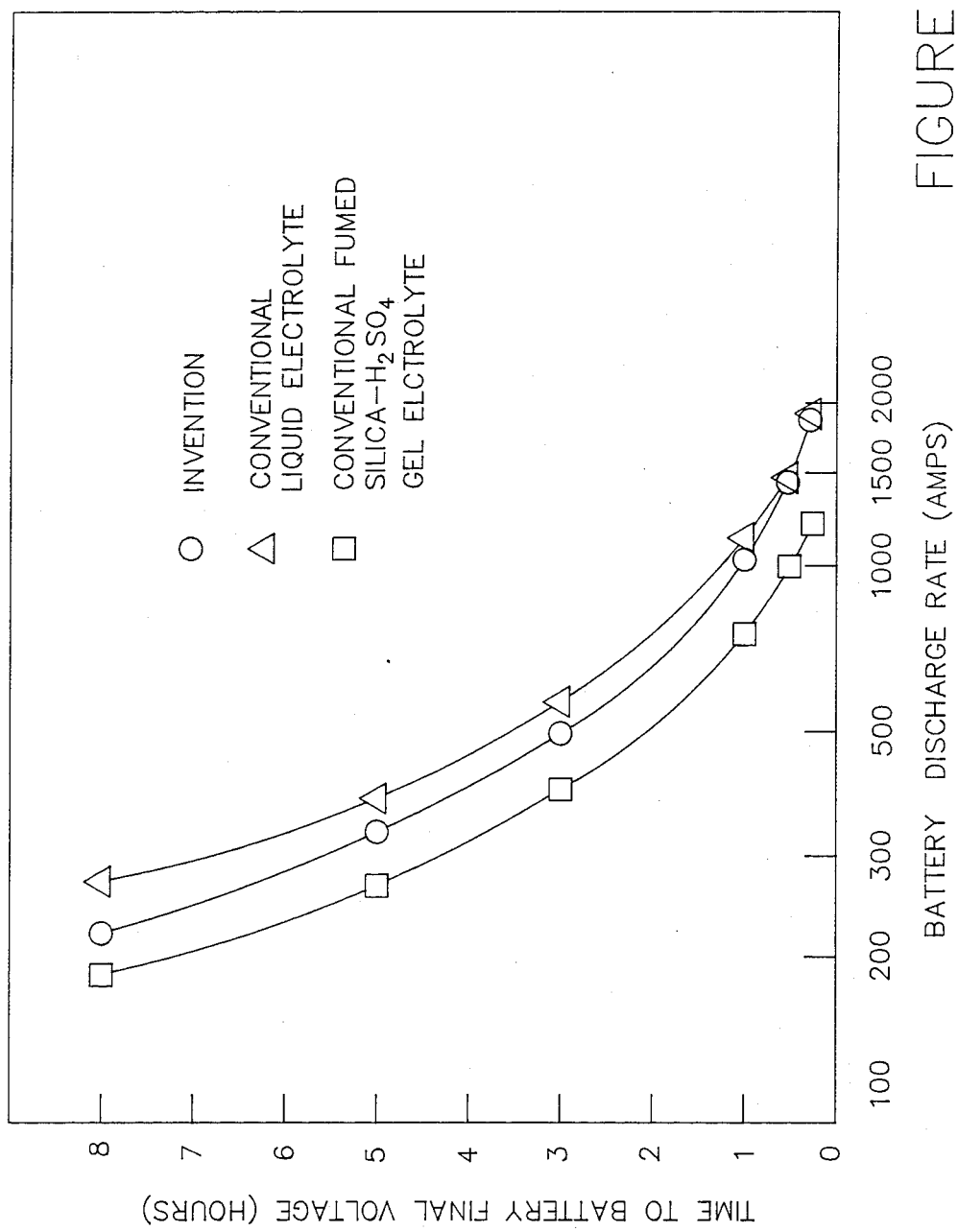
FIG. 3 is a curve comparing performance characteristics of a battery manifesting the invention to conventional liquid electrolyte and conventional fumed silica gelled electrolyte lead-acid batteries.

FIG. 3 illustrates a comparison of performance characteristics for batteries embodying the invention to comparable batteries utilizing conventional (ungelled) liquid sulfuric acid as the electrolyte and to comparable batteries utilizing a conventional combination of fumed silica and sulfuric acid as a gel electrolyte. In FIG. 3, the time for the battery to reach its final voltage, where final voltage is defined as a non-time varying voltage sustained by the battery as current is withdrawn from the battery at a given rate, is plotted as a function of battery discharge rate in amps, on a semi-log scale. Data for batteries embodying the invention is illustrated with circles indicating the data points, data for comparable batteries using conventional, ungelled liquid sulfuric acid electrolyte is illustrated with triangles indicating the data points and data for comparable batteries using fumed silica-sulfuric acid gelled electrolyte is illustrated with squares indicating the data points.

As illustrated in FIG. 3, batteries embodying the invention display surprising and unexpected performance improvements over comparable conventional fumed silica-sulfuric acid gelled electrolyte lead-acid batteries. Specifically, the characteristic curve of batteries embodying the invention is shifted to the right relative to the characteristic curve of a comparable, conventional fumed silica-sulfuric acid gelled electrolyte lead-acid battery. Indeed, as battery discharge rate increases (and time to final voltage correspondingly decreases), the characteristic curve of batteries embodying the invention assymptote to the characteristic curve of a comparable conventional (wet) liquid electrolyte lead-acid battery. Moreover, respecting comparison between batteries embodying the invention and conventional fumed silica-sulfuric acid lead-acid batteries, the shift to the right of the characteristic curve (in FIG. 3) for batteries embodying the invention manifests a substantial increase in the time for the battery to reach its final voltage for a given discharge rate. In other words, for a given rate of current produced, a battery embodying the invention takes a longer time to reach its final voltage (thereby indicating approach of the end of battery life) than a conventional fumed silica-sulfuric acid gelled electrolyte lead-acid battery. This means that batteries embodying the invention have greater discharge life expectancy than comparable conventional fumed silica-sulfuric acid gelled electrolyte lead-acid batteries.

From FIG. 3, at a time to reach final voltage of eight hours, batteries embodying the invention manifest about a fifteen (15%) percent increase in discharge rate, (meaning that about fifteen (15%) percent more current is supplied by the battery) as compared to a conventional fumed silica-sulfuric acid gelled electrolyte lead-acid battery. Similarly, at the other end of the curves (one hour to reach final voltage), batteries embodying the invention produce nearly twenty-five (25%) percent more current over the time it takes for the batteries to reach their final, non-time varying voltage, as compared to current produced by conventional fumed silica-sulfuric acid gelled electrolyte lead-acid batteries.

Perhaps of greatest significance is the fact that at progressively higher discharge rates, batteries embodying the invention manifest performance characteristics that asymptotically approach that of conventional (wet) liquid electrolyte lead-acid batteries, as illustrated by FIG. 3.

The following is claimed:

1. A method for producing a lead-acid battery having a thixotropic gel electrolyte, comprising combining an aqueous colloidal dispersion of alkali metal polysilica with sulfuric acid while introducing said combination into a lead-acid battery precursor.

2. The method of claim 1 wherein said combining is performed continuously.

3. The method of claim 2 wherein said aqueous colloidal dispersion of alkali metal polysilica is from about ten percent (10%) to about fifty percent (50%) by weight alkali metal polysilica.

4. The method of claim 1 wherein said combining is performed in a stream while filling a wet formed lead-acid battery precursor with said stream.

5. The method of claim 4, wherein said alkali metal polysilica is combined with said sulfuric acid in a ratio of between about 1:1 to about 1:6 parts by weight.

6. The method of claim 5 wherein said alkali metal is sodium.

7. The method of claim 6 further comprising maintaining said battery with said combination of the aqueous colloidal dispersion of alkali metal polysilica and sulfuric acid therein in a quiescent state until said combination thickens into a gel due to reaction of said alkali metal polysilica with said sulfuric acid.

8. The method of claim 7 wherein said gel is essentially homogeneous.

* * * * *